…

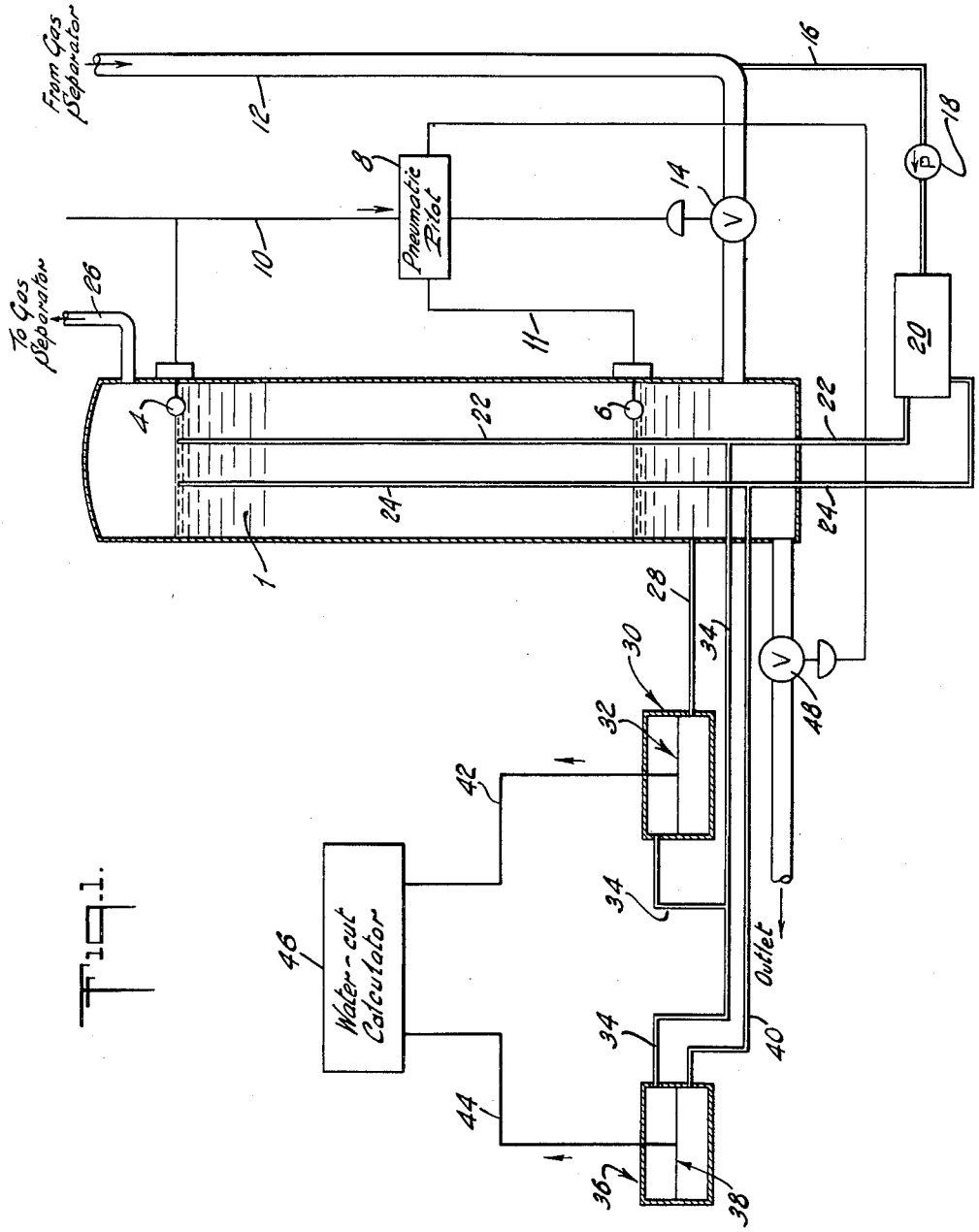

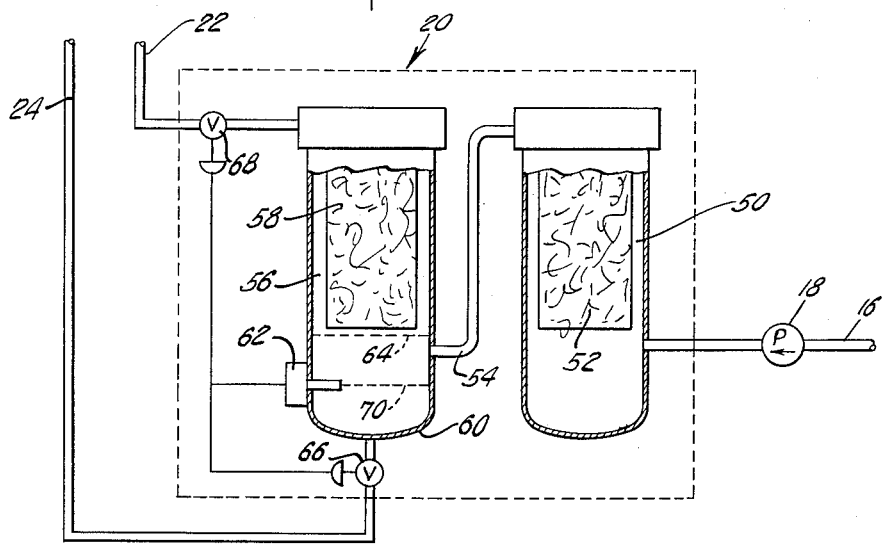
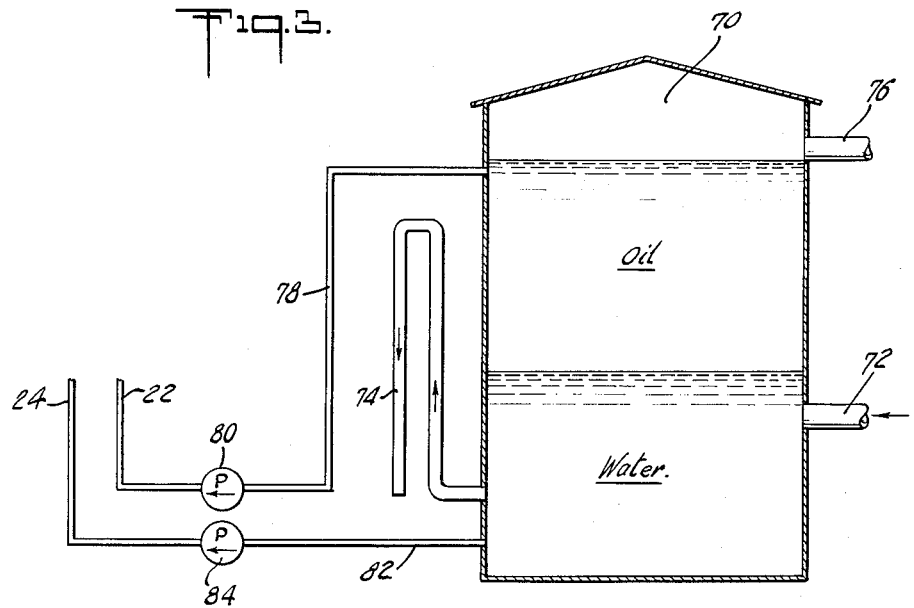

United States Patent Office 3,009,359
Patented Nov. 21, 1961

3,009,359
AUTOMATIC WELL TESTING SYSTEM
Laurence M. Hubby, Bellaire, Tex., assignor to Texaco Inc., a corporation of Delaware
Filed June 11, 1957, Ser. No. 665,095
8 Claims. (Cl. 73—438)

This invention relates to a method and apparatus for determining the amount of water in an oil-water mixture. More particularly, it relates to a method and apparatus for making a water-cut determination of a crude oil mixture independently of the physical characteristics of the mixture.

In the operation of oil leases, wells frequently produce varying amounts of water along with the oil and gas. In order ot determine the volume of oil produced, it is necessary to determine how much of the produced fluid is water and how much is oil. Determination of the net oil produced is necessary for most efficient operation of the well and for the purpose of complying with production allowables of State Regulatory Bodies. One way of determining the amount of oil and water present in the produced fluid is to separate the oil from the water and measure each separately. This requires the use of expensive treating equipment and adds considerably to the cost of operating the lease. It is an object of this invention to provide a means of making a water-cut measurement on the well fluid without separating the oil from the water and measuring the volume of each.

In normal lease operation, it is common for a number of wells to be connected by pipes, known as flow lines, into a single system known as a Tank Battery, where common facilities are provided for all wells for gas removal, for separating the oil from the water and for storing the oil until it is shipped elsewhere. Facilities are also provided for periodically testing each well to determine the volume of fluid produced and its water-cut. The various wells may produce from different portions of the reservoir and, as a result, the physical properties of the oil, such as density, may vary from one well to another. Likewise the water produced by the various wells may differ in density because of the variation in the dissolved solids contained in it. In any system designed to measure water-cut by measuring the density of the produced fluid, these differences in the oil and water densities produced by various wells must be taken into account, otherwise errors will be introduced into the measurement.

In accordance with the present invention, a method of determining the water content of an oil-water mixture is disclosed which provides for any variation in the density of the oil and the water. This broadly comprises storing said oil mixture in a vertical column, separating a portion of said mixture into an oil phase and a water phase, storing said oil phase in a vertical column to a height equal to the stored mixture, storing said water phase in a vertical column to a height equal to the stored mixture, measuring the pressure differential between the column of oil and the column of the mixture at about the same depth, measuring the pressure differential between the column of oil and the column of water at about the same depth, and then calculating the actual amount of water present in the mixture from the measurements obtained.

The storage columns for the water phase and oil phase are preferably situated within the stored oil-water mixture so that there is an indirect heat exchange relationship between these fluids thereby alleviating any errors due to differences in temperatures.

In order to facilitate storing of the liquids in the three columns at equal heights, the oil phase and water phase each discharge from the top of their respective columns into the mixture having a high liquid level mark or line which is slightly higher than the columns containing the oil phase and the water phase.

The method is advantageously carried out in cyclic fashion to determine the water content of an oil-water mixture produced by a well. The total volume of fluid produced by the well is measured, rather than a sample thereof. This eliminates the effect of non-homogeneous composition of the fluid which frequently causes "samplers" to be unsatisfactory in this service. In the cyclic process, after a water-cut determination has been made, the oil-water mixture is discharged from its storage column; the oil and water phases remain in their respective columns until displaced by additional oil and water from the next stream being tested.

In normal operation a well will be tested for a fixed period of time, such as 24 hours. During this time, the fluids in the oil phase and water phase columns will be gradually displaced by new fluid taken from the stream being tested, a small volume being introduced into the columns during each filling of the storage column. At the end of the test period, the well will be switched out of the test system and another well will be switched into the test system. In order to displace the fluids which remain in the oil phase and water phase columns from the last well, a purge period is provided at the start of each test of a well. During this purge period the pump is operated at an increased rate and the fluids remaining in the filter and the oil phase and water phase columns are displaced by fluids from the new well. After this purge process has been completed, the test of the new well is started. In this way, the density comparisons are always made with oil and water phases from the well being tested, thus eliminating errors which might be introduced by differences in the density of fluids from different wells.

The invention includes an apparatus for determining the water content of an oil-water mixture comprising means to separate a portion of the mixture into an oil phase and a water phase, means to store the oil-water mixture, means to store at least a portion of the oil phase, means to measure a density differential between the stored oil and the stored mixture, means to store at least a portion of the water phase, and means to measure the density differential between the stored water phase and the stored oil phase. The means to store the fluid are vertical columns, for example a tank and standpipes and preferably the storage column for the oil-water mixture is relatively large as compared to the water phase and oil phase columns, and capable of containing both of the said water phase and oil phase columns so that the fluids have an indirect heat exchange relationship with each other. The means to measure a density differential between the various fluids preferably includes a means to fill said columns with their respective fluids to equalize effective heights, means to measure a pressure differential between the stored oil phase and the stored mixture and means to measure a pressure differential between the stored oil phase and the stored water phase. The means to fill said columns to equalized effective heights preferably comprises providing columns for the water phase and oil phase of equal heights and having open tops. The high liquid level mark of the mixture in the large column being slightly higher than the tops of the water phase and oil phase columns, thus providing equalized effective heights for all three columns. The pressure differential between the fluids is made at about the same depth in the columns.

Further understanding of the invention will be had by reference to the accompanying drawings in which FIG. 1 is a diagrammatic representation of the water-cut determination apparatus; FIG. 2 is a representation of the preferred filtering system; and FIG. 3 is a modification of the filtering means of the invention.

The apparatus comprises a metering vessel 1 which has a relatively large length to diameter ratio. A high level float control 4 and a low level float control 6 are associated with the metering vessel or tank 1 to provide control of the filling thereof. These float controls regulate the flow of a gas such as air to the pneumatic pilot 8 through lines 10 and 11. Inlet conduit 12 is provided as a means to conduct the oil-water mixture from a gas separator to the tank 1. The flow of oil through conduit 12 into tank 1 is regulated by diaphragm valve 14 which is operated by gas under pressure coming from the pneumatic pilot 8.

Small conduit 16 leads from the large conduit 12 through pump 18 to a filtering system, broadly designated as 20. Pump 18 forces the oil from conduit 16 into and through the filtering system 20. The oil phase coming from the filtering system 20 passes into standpipe 22 and the water phase from the filtering system passes into standpipe 24.

In FIG. 2, the filtering system broadly designated as 20 is shown. The oil-water mixture coming through pump 18 enters a two-stage liquid separator. The first stage comprises a container 50 having a coalescing filter 52 suspended therein. Filter 50 consists of a porous plastic substance which brings about the breaking of mechanical emulsion causing finely dispersed water droplets to form larger drops of water most of which drop to the bottom of container 50. The mixture then passes through line 54 to the second stage which comprises a container 56 having filter 58 suspended therein. Filter 58 is made up of oil-treated paper or filter sections which separate the remainder of the water from the oil passing therethrough. A filter which is similar to the above described filter and which is commercially available is the "Fram Two-Stage Oil-Water Separator." The separated water in container 56 collects in the water sump 60. A water detecting device, such as conductivity probe 62, controls the flow of oil and water into standpipes 22 and 24. When the probe 62 is immersed in water, such as when the water level is at dotted line 64, it opens valve 66 and closes valve 68, causing pump 18 to move the collected water into column 24. When the probe 62 is immersed in oil, such as when the water level is at dotted line 70, it opens valve 68 and closes valve 66 causing pump 18 to move the clean oil into column 22.

It is emphasized, however, that any filtering means or device which will serve to obtain a complete separation of any water which is in the produced oil can be used in this portion of the apparatus.

For example, in locations where all wells flowing to the battery produce the same gravity of oil and water, the oil and water columns may be filled with fluids directly from the oil-treating system; thus eliminating the use of the filter. The oil-treating system is a standard part of all batteries serving wells which produce water, and may consist of a heater-treater, a gun-barrel, a settling tank, or other oil-water separating device. In this arrangement, oil and water which have been separated by the common treating system are withdrawn from the treating system and pumped directly into columns 22 and 24 during each filling of tank 1.

FIG. 3 shows one example of an arrangement of a settling tank 70 used to provide the separated oil and water phases for standpipes 22 and 24. Crude oil is pumped into the settling tank through inlet 72. The water settles to the bottom and is removed through water siphon 74, the height of which controls the water level in tank 70. The pure oil, for storage or further treatment, leaves the tank through outlet 76. Oil for standpipe 22 is drawn from the tank through pipe 78 by pump 80 and water for standpipe 24 is drawn from the tank through pipe 82 by pump 84.

Both standpipes 22 and 24 as seen in the drawing preferably extend to just below the high liquid level mark of the oil-water mixture and are open at the top to tank 1.

These standpipes are preferably of exceedingly small diameter but must be larger than capillary size.

The high level of the oil-water mixture in tank 1 is controlled by the high level float 4 so that it will be slightly above the tops of standpipes 22 and 24. When tank 1 is filled to the high liquid level, the heights of the three columns, namely those fluid columns in tank 1 and standpipes 22 and 24, will be equal. In other words, this is one and the preferred method of obtaining columns of fluids which have equalized effective heights.

By positioning the standpipes 22 and 24 within the tank 1 as seen in the drawing, a condition of indirect heat exchange is afforded which maintains an equal temperature in all three of the fluids.

Conduit 26 preferably leads from the top of tank 1 through a valve system (not shown) to a gas separator from which the oil mixture originally came. Any gas which may separate from the oil while in the water-cut apparatus is exchanged freely between the metering vessel 1 and the separator during the filling and draining of the system. However, during the measuring portion of the cycle, the valves between the metering vessel and the separator along line 26 isolate the metering vessel causing a static pressure system.

Line 28 leads from tank 1 to the lower portion of a differential pressure cell 30 having diaphragm 32. Line 34 leads from the lower portion of standpipe 22 to both the upper portion of the differential pressure cell 30 and to the upper portion of differential pressure cell 36 having diaphragm 38. Line 40 leads from the lower portion of standpipe 24 to the lower portion of differential pressure cell 36. Thus means are established to measure the density difference between the stored oil-water mixture in tank 1 and the pure oil or oil phase of the filtered oil-water mixture in standpipe 22 and means are also provided to measure the density difference between the stored pure oil in standpipe 22 and the stored water or water phase from the filtered oil-water mixture in standpipe 24. The measurements obtained are transmitted from each of the pressure differential cells 30 and 36 along lines 42 and 44 to a water-cut calculator 46 which supplies the resulting water-cut determination in standard units.

The operation of the system shown in FIG. 1 can be described as follows: Produced fluids comprising a mixture of an oil of unknown density and a small portion of water of unknown density flow from the gas separator to the metering vessel by gravity through line 12. Gas is exchanged freely between the metering vessel 1 and separator through line 26 during the filling and draining portions of the cycle. During the filling period pump 18 forces a small part of the oil-water mixture from line 12 through small line 16 into filtering system 20 where it is separated into its oil and water phases. The purified oil then moves into standpipe 22 and the oil-free water moves into standpipe 24, and each discharges from the top of its respective standpipe into the oil-water mixture which has almost reached the high level mark controlled by float 4. When the vessel 1 is full, the float control 4 signals the pneumatic pilot 8 which causes valve 14 to close. At the same time, pump 18 is caused to stop and line 26 is closed. At this time conditions in the metering vessel 1 reach a static state. While these static conditions prevail, the differential pressure devices 36 and 30 measure the diffential pressure between the oil and water columns 22 and 24 and the differential pressure between the oil and oil-water mixture columns 22 and 1, respectively, and send the result to water-cut calculator 46. Since the difference in pressure between the pure oil and the pure water is known and the difference between the pure oil and the oil-water mixture fluid or oil-water mixture is known, the actual water-cut of the oil-water mixture is determined by the relation of these two known pressure differences, giving a determination of the water-cut which is free of error due to any difference in the density of the oil or the water in the oil-water mixture.

It may be seen that if the unknown oil-water mixture comprises 100% oil, the density difference between the oil phase column and the unknown mixture will be zero, hence zero water-cut. Likewise, if the unknown mixture is 100% water, the density difference between the oil phase column and the unknown mixture will be equal to the density difference between the oil phase column and the water phase column, hence 100% water-cut. In a similar manner, the density of any unknown mixture of this same oil and water will fall between the density of its oil phase and the density of its water phase and its water-cut may be determined.

In other words, the density difference between the oil and water being a function of the pressure difference, is used to divide the density difference between the oil phase and the oil-water mixture to obtain the water-cut determination, wherein provision has been made for a variation in the density of both the oil and the water.

It should be noted that this water-cut determination is free of errors due to gravity or type of oil, temperature, separator pressure or height of measuring vessel column as well as the density of the oil and water since all these factors affect equally the difference in pressure between the oil phase and water phase columns and the difference in pressure between the oil phase and oil-water mixture columns.

After the water-cut determination has been made, which ordinarily takes a short period of perhaps 30 seconds, a time cycle controller signals the pneumatic pilot 8 to open diaphragm operated valve 48 to permit the draining of tank 1.

Obviously, many modifications and variations of the invention, as hereinbefore set forth, may be made without departing from the spirit and scope thereof, and therefore, only such limitations should be imposed as are indicated in the appended claims.

I claim:

1. An apparatus for determining the water content of an oil-water mixture comprising means to separate a portion of the mixture into an oil phase and a water phase, storage means to contain a metered quantity of the oil-water mixture, means to store at least a portion of said oil phase with the top thereof at substantially the same level as that of said oil-water mixture, means to measure a density difference between the stored oil phase and the stored mixture by static pressure differential, means to store at least a portion of said water phase with the top thereof at substantially the same level as that of said oil-water mixture, and means to measure a density difference between the stored water phase and the stored oil phase by static pressure differential, whereby the water-cut may be determined.

2. An apparatus for determining the water content of an oil-water mixture which comprises means to separate a portion of the mixture into an oil phase and a water phase, a mixture storage column, an oil phase storage column, a water phase storage column, means to fill all of said columns with their respective fluids to equalized effective heights, means to measure a static pressure differential between the stored oil phase and the stored mixture at a given level below the tops of said columns, and means to measure a static pressure differential between the stored oil phase and the stored water phase at said given level below the tops of said columns, whereby the water-cut may be determined.

3. An apparatus for determining the water content of an oil-water mixture comprising means to filter the water from a portion of said mixture thereby creating a water phase and an oil phase, a large vertical storage column for said mixture, a small cross-sectional water phase storage column disposed within said large storage column, a small cross-sectional oil phase storage column disposed within said large storage column, means to fill said columns to equalized effective heights with their respective fluids, means to measure the pressure differential between the column of oil and the column of the mixture at about the same depth, and means to measure the pressure differential between the column of oil and the column of water at about the same depth.

4. A method of determining the water content of an oil-water mixture which comprises the steps of storing said oil-water mixture in a vertical column with the top thereof at a given level, separating a portion of said mixture into an oil phase and a portion thereof into a water phase, storing said oil phase in a vertical column with the top thereof at said given level, storing said water phase in a vertical column with the top thereof at said given level, taking a static pressure differential measurement of said column of oil and said column of mixture at a predetermined distance below said given level, and taking a pressure differential measurement of said column of oil and said column of water at said predetermined distance below said given level, so that the water content of said oil-water mixture may be calculated.

5. A cyclic method of determining the water content of an oil-water mixture at periodic intervals comprising the steps of storing at least a portion of said mixture in a first vertical column with the top thereof at a given level, taking some of said mixture and separating it into the water phase and the oil phase thereof, flowing said oil phase into a second vertical column disposed within said first column and having the top of said second column effectively at said given level, flowing said water phase into a third vertical column disposed within said first column and having the top of said third column effectively at said given level, taking a static pressure differential measurement of said column of oil phase and said column of mixture at a predetermined distance below said given level, taking a static pressure differential measurement of said column of oil phase and said column of water phase at said predetermined distance below said given level, so that the water content of said mixture may be calculated, draining said three columns, and repeating the entire process at successive intervals.

6. An apparatus for determining the relative proportions of oil and water in an oil-water mixture comprising means to separate a portion of the mixture into a clean oil phase and a clean water phase, storage means to contain a quantity of the oil-water mixture, means to store at least a portion of said clean oil phase with the top thereof at substantially the same level as that of said oil-water mixture, means to store at least a portion of said clean water phase with the top thereof at substantially the same level as that of said oil-water mixture, and means to measure the pressure differentials between one of said clean fluid columns and each of the other two columns, both at predetermined equal distances below the top of said metered quantity.

7. An apparatus for determining the relative proportions of oil and water of an oil-water mixture comprising means to separate a portion of the mixture into a clean oil phase and a clean water phase, a large vertical storage column for said mixture, a small cross-sectional clean water phase storage column disposed within said large mixture storage column, a small cross-sectional clean oil phase storage column disposed within said large storage column, means to fill said columns to equal effective heights with their respective fluids, and means located at a given level below the tops of said columns to separately measure the pressure differentials between one of said clean fluid columns and each of the other two columns.

8. A method of determining the relative proportions of oil and water of an oil-water mixture which comprises the steps of storing said oil-water mixture in a vertical column with the top thereof at a given level, separating a portion of said mixture into a clean oil phase and a portion thereof into a clean water phase, storing said clean oil phase in a vertical column with the top thereof at said given level, storing said clean water phase in a vertical column with the top thereof at said given level, taking a static pressure differential measurement between one of said clean fluid phases and each of the other two columns at a predetermined distance below said given level, so that the relative proportions of oil and water of the mixture may be calculated.

References Cited in the file of this patent

UNITED STATES PATENTS 2,758,477     Haeber                 Aug. 14, 1956